Oct. 19, 1937.  C. W. SHORT  2,096,347
EXTRUDING DIE
Filed Feb. 20, 1935  2 Sheets-Sheet 2
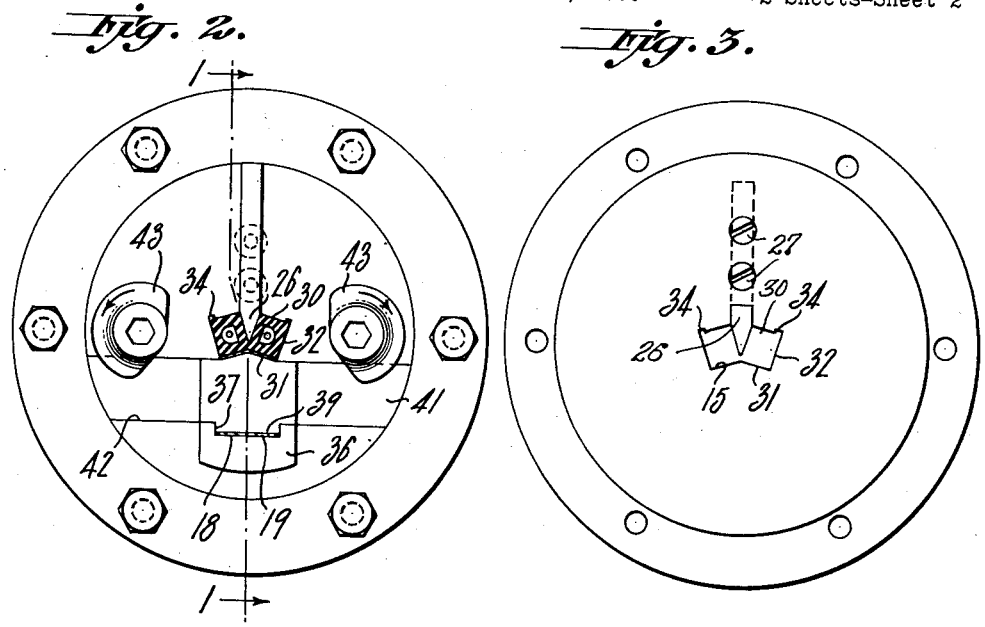
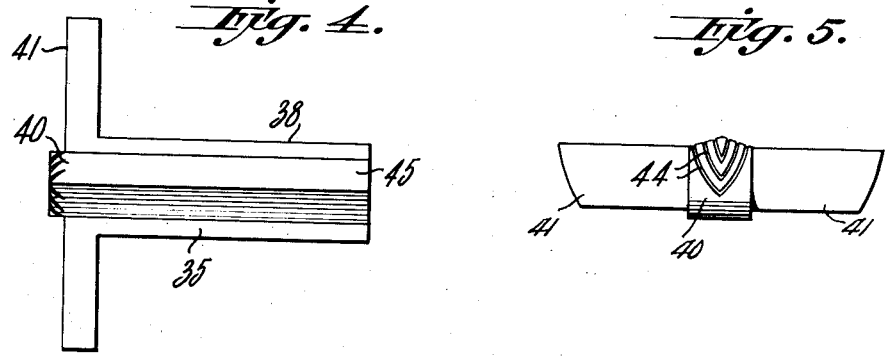
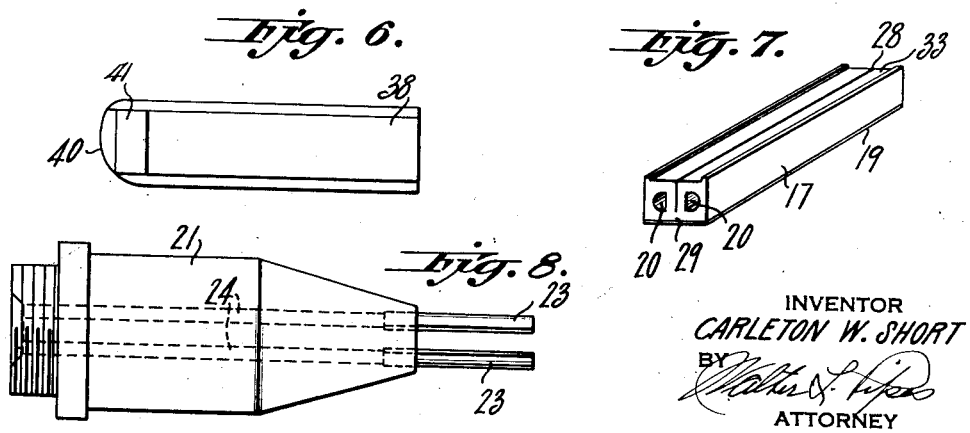
INVENTOR
CARLETON W. SHORT
BY
ATTORNEY Patented Oct. 19, 1937

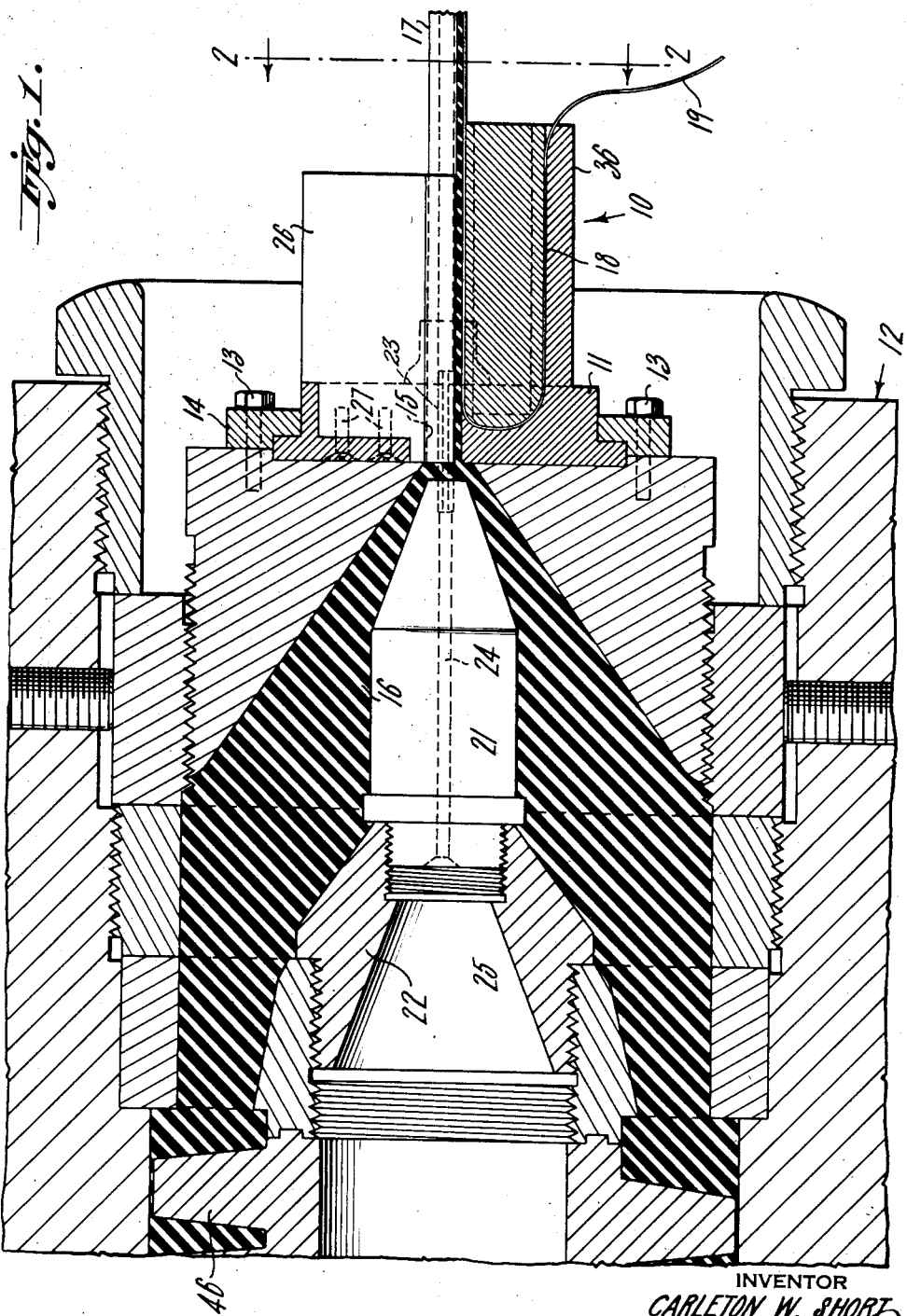

2,096,347

UNITED STATES PATENT OFFICE 2,096,347

EXTRUDING DIE

Carleton W. Short, East Providence, R. I., assignor to United States Rubber Products, Inc., New York, N. Y., a corporation of Delaware Application February 20, 1935, Serial No. 7,339

4 Claims. (Cl. 18—13)

This invention relates to a die for forming extruded strips of plastic material and particularly for reinforcing and/or protecting such strips and also for forming longitudinal passages therein.

Some plastic materials are relatively soft and fragile immediately upon leaving the die in the form of a strip, and some difficulty is had in handling such materials until they have been subsequently treated to harden or toughen and strengthen them. Also in the operation of extruding hollow articles or strips there is a tendency for the walls to collapse due to formation of a subatmospheric pressure within the hollow portions.

Such difficulties are found in the extrusion of plastic rubber or rubber-fibre compositions into strips having passages extending therethrough for the reception of electrical conductors and which are subsequently toughened and strengthened by vulcanization. In this application of the invention, it is desirable to protect at least one side of the strip from the talc or other adhesion preventive material which is applied to the tacky rubber surface of the strip to reduce its tackiness, and also protect the strip from oxidation so that a rubber cement will adhere thereto for the purpose of attaching the strip to the side of a wall or other objects.

In accordance with this invention, particularly in reference to its application to making hollow flexible rubber strips for use as electrical conduits the extruding die is provided with a means for applying a reinforcing material to the soft plastic and relatively fragile rubber strip as it is being extruded in the die. Preferably the reinforcing material is in the form of a tape, preferably cotton fabric, which will adhere to the tacky rubber strip under the pressure within the extruding passage and protect it from foreign matter until it is ready to be applied to some surface, but which may be detached after the strip is vulcanized. Means are also provided in this improved die for the admission of air to the passages within the strips for the purpose of relieving the tendency of the formation of a reduced pressure therein as the passages are being formed and thereby prevent the walls of the passages from being collapsed by the external atmospheric pressure.

Among other objects of this invention, the die is provided with a means for forming a plurality of passages in the conduit and a longitudinal slit between the passages so that the strip can be divided along the longitudinal slit.

The above and other objects and novel features of this invention will be more clearly understood by referring to the following description and accompanying drawings in which:

Fig. 1 is a cross sectional view on line 1—1 of Fig. 2 of an embodiment of this invention illustrating an extruding die connected to an extruding head;

Fig. 2 is a front elevational view of the extrusion die on line 2—2 of Fig. 1;

Fig. 3 is a rear view of the die with the passage forming mandrel removed therefrom;

Figs. 4, 5 and 6 are respectively top plan, rear end and side views of a part of the extruding die;

Fig. 7 is an isometric view of an extruded strip suitable for use as an electrical conduit; and Fig. 8 is a mandrel adapted to extend into the extruding passage in the die to form the passages in the strip shown in Fig. 7.

The embodiment of the invention illustrated in the drawings comprises a die 10 having a body 11 adapted to be attached to an extruding head 12 by bolts 13 and a ring 14. A passage 15 is formed in the die 10 through which the plastic material 16 is extruded by the extruding head 12 to form the strip 17 which extends from the front of the die. A second passage 18 is formed in the die 10 for guiding reinforcing material preferably a ribbon in the form of a fabric tape 19 into and along the bottom of the extruding passage 15 so that it will be drawn into the passage and adhere to the strip 17 while the strip is extruded. For the purpose of forming passages or conduits 20 in the extruded strip 17 a mandrel 21 about which the plastic 16 is extruded is attached at one end to the spider 22 of the extruding head 12 and the other end of the mandrel is provided with tongues 23 which extend into the extruding passage 15. The mandrel 21 is provided with air passages 24 which extend from the central passage 25 in the spider to the end of the tongues 23 for the purpose of admitting air to the passages 20 formed in the strip 17. A slit forming knife is secured to the die body 11 by screws 27 and extends into the extruding passage 15 and between the tongues 23 for the purpose of forming a slit 28 in the extruded strip 17.

The die 10 as shown herein is adapted to make substantially rectangular strips 17 having a pair of longitudinal passages 20 extending therethrough, and a slit 28 extending between the passages 20 but the walls of the separate passages are connected by a bridge 29 of material extending therebetween. In order to have the extruded strip 17 attain its rectangular form after it extends beyond the slitting knife 26 and when the slitted portions are pressed together, the top and bottom 30 and 31 respectively of the extruding passage 15 slope laterally from the center and the side walls 32 are arranged perpendicular thereto. In order to provide a top groove 33 in the strip 17 a longitudinal groove 34 is provided along each side of the top of the extruding passage 15. As shown in Fig. 3, the entrance to the extruding passage 15 of the above described shape is formed in the rear of the die body 11.

The tape groove 18 is formed in the die by forming a recess in the die body 11 to receive a slide which may be in the form of the T shaped member 35 shown in detail in Figs. 4, 5 and 6. The body 11 is provided with a projection 36 having a groove 37 formed in its top portion. The stem 38 of the T member 35 is supported by the top edge of the groove 37 and is provided with a tongue 39 which extends into the groove 37 in the projection 36. The tape groove 18 is formed between the bottom of the groove 37 in the projection 36 and the bottom side of the tongue 39.

The head 40 of the T stem 38 is rounded and extends into a correspondingly shaped slot in the die body 11. The head 41 of the T member 35 extends into a lateral groove 42 in the body 11 and is secured therein by clamping nuts 43. The nuts 43 are provided with a beveled surface adjacent to the T head 41 and when rotated in the direction of the arrows through a quarter of a turn they bear against the T head 41 and retain the T member 35 in place in such a manner that the curved head 40 of T stem 38 is spaced from the end of the corresponding groove formed in the die body 11. In that manner a continuous groove 18 for the tape 19 is formed in the die which extends from the front of the die and terminates in a U shaped portion which extends into the bottom of the extruding passage 15 and angularly towards the front of the die.

In order to retain the tape 19 in a laterally stretched condition as it enters the extruding passage 15, laterally divergent grooves 44 are formed in the curved head of the stem of the T member 35. The top side 45 of the T stem 38 slopes laterally downward from the center of the stem and conforms to the shape of the bottom 31 of the extruding passage 15 formed in the die body 11.

In the operation of this invention, the plastic is extruded from the extruding head 12 by means of a screw 46 which forces the plastic around the passage forming tongues 23 on the end of the mandrel 21. The tape 19 being previously inserted in the tape groove 18 and extending into the extruding passage 15, the plastic is forced by the screw 46 into the passage 15 and in contact with the top surface of the tape. The forward force of the plastic draws the tape along with it through the extruding passage. The tape 19 enters the passage 15 at a point where sufficient pressure will be exerted by the extruded plastic, in the case of a tacky rubber composition, to cause the rubber to adhere to the top surface of the tape. The point where the tape 19 enters the passage 15 varies in accordance with the composition and the temperature of the rubber plastic and the rate at which it is extruded. The point of entrance of the tape is determined by the pressure in extruding passage 15 which will not be too great as to cause the plastic to be forced into the tape groove but will be sufficient to cause the tacky rubber plastic to adhere to the tape. The tape 19 before entering the groove 18 is preferably lubricated with rubber cement containing a quick drying organic solvent.

The knife 26 holds the slit spread apart for a sufficient distance in front of the die to allow a non-adhesive material, such as soapstone for example, to be inserted in the slit to prevent its sides from sticking together when brought together as shown in Fig. 7.

Extruded strips when made of plastic rubber such as described are relatively fragile and the tape 19 being adhered to the strip 18 re-inforces it until it has been vulcanized. It will be understood that the strip 17 may be reinforced with other materials, such as a strong or quick drying plastic which may be forced into the groove 18 and adhered to the strip as a substitute for the tape 19. After the strip 17 is vulcanized, which forms no part of this invention, electrical conductors are inserted in the passages 20 and a second tape is applied to the top groove 33 to prevent the slit 28 from spreading. The strip is then in suitable condition for use and may be applied to a wall or other object after tearing off the tape 19 and then cementing that side of the strip to the wall.

While the preferred embodiment of this invention has been described herein, it will be understood that changes in the details may be made without departing from the spirit of the invention and the scope of the claims appended hereto.

Having thus described my invention what I claim and desire to protect by Letters Patent is:

1. An extruding die having a strip forming passage therein and a tape passage extending into said strip forming passage at an acute angle and inclined in the direction of the discharge end of said strip forming passage, said tape passage terminating in a U-shaped portion at its entrance into said strip forming passage, said U-shaped portion having grooves in its rearwardly facing wall diverging laterally from the center of said tape passage and towards the discharge end of said strip forming passage, said grooves being adapted to spread the tape as it enters the strip forming passage.

2. An extruding die comprising a body having an extruding passage formed therein, a groove formed in said body and opening into the bottom of said passage and extending lengthwise thereof, a slide cooperating with said groove and having its bottom surface spaced from the bottom surface of said groove to provide a tape passage extending from the exterior of said extruding passage to its interior, and means for securing said slide in position on said body.

3. An extruding die comprising a body having an extruding passage formed therein, a groove formed in said body and opening into the bottom of said passage and extending lengthwise thereof, said groove having a rounded rear end so arranged that the bottom of said extruding passage is substantially tangential thereto, a slide having bottom and rear end portions conforming to the shape of the bottom and rear end of said groove and cooperating therewith to form a tape passage, and means for securing said slide in position on said body.

4. An extruding die comprising a body having an extruding passage formed therein, a groove formed in said body and opening into the bottom of said passage and extending lengthwise thereof, said groove having a rounded rear end so arranged that the bottom of said extruding passage is substantially tangential thereto, a slide having bottom and rear end portions conforming to the shape of the bottom and rear end of said groove and cooperating therewith to form a tape passage, the rear end of said slide having grooves formed in the surface thereof which diverge laterally from the center of the tape passage and towards said extruding passage.

CARLETON W. SHORT.